C. EMERSON & J. PETERSON.
AXLE LUBRICATOR.
APPLICATION FILED OCT. 26, 1909.
977,287.
Patented Nov. 29, 1910.
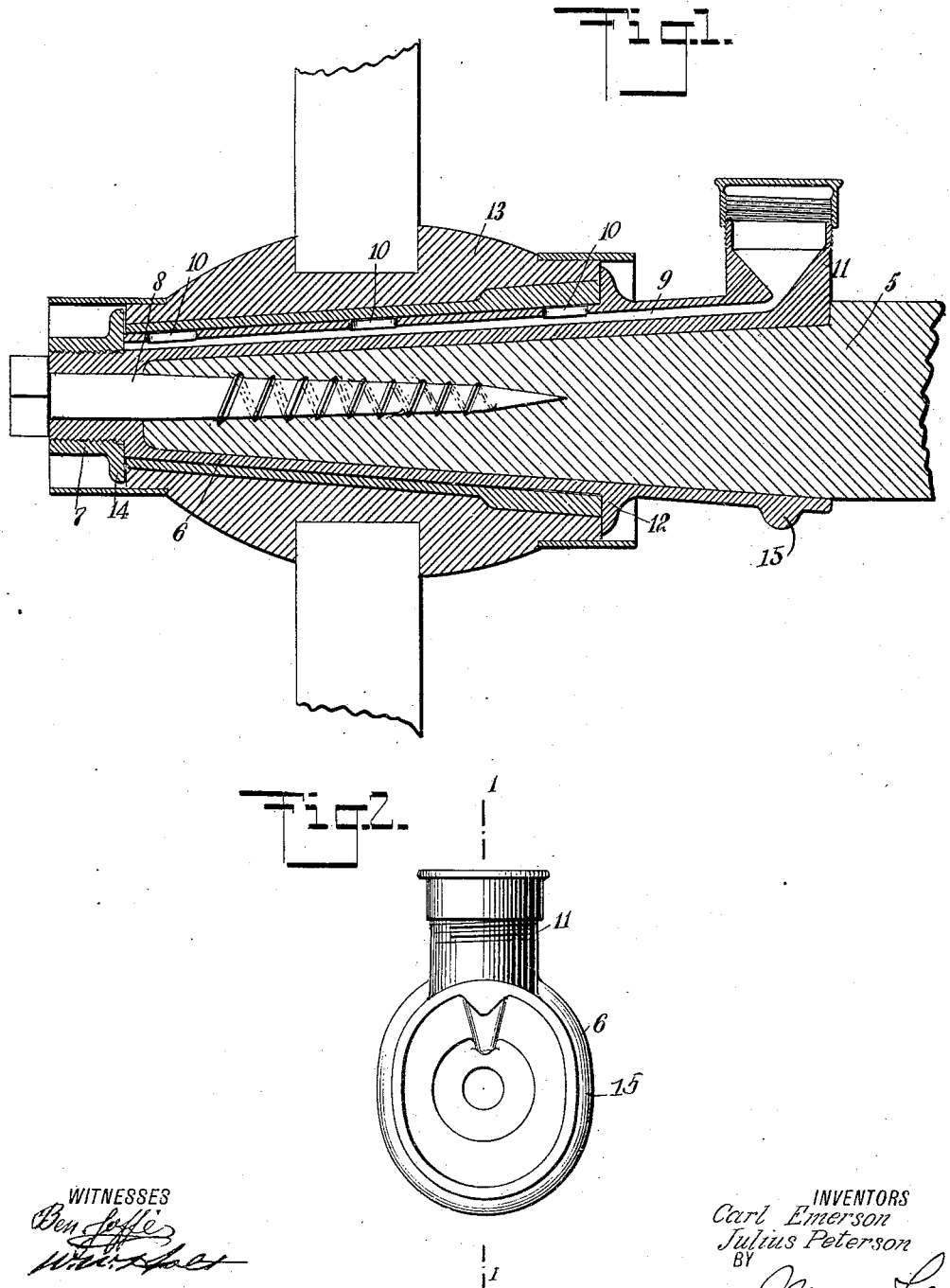
WITNESSES
INVENTORS
Carl Emerson
Julius Peterson
BY
ATTORNEYS
THE NORRIS PETERS CO., WASHINGTON, D. C.

UNITED STATES PATENT OFFICE.

CARL EMERSON AND JULIUS PETERSON, OF MINNEAPOLIS, MINNESOTA.

AXLE-LUBRICATOR.

977,287.  Specification of Letters Patent.  Patented Nov. 29, 1910.

Application filed October 26, 1909. Serial No. 524,644.

*To all whom it may concern:*

Be it known that we, CARL EMERSON and JULIUS PETERSON, citizens of the United States, and residents of Minneapolis, in the county of Hennepin and State of Minnesota, have invented a new and Improved Axle-Lubricator, of which the following is a full, clear, and exact description.

The invention is an improvement in lubricating axles for vehicles, relating more particularly to axles embodying a wooden axle-tree provided with an axle-skein, the invention being characterized by coring in the skein a lubricating passage, the passage having discharge openings along the length of the journal portion of the skein, preferably located at the opposite ends and at an intermediate point of the said journal portion and communicating, and extending from a point a substantial distance at the inner side of the said journal portion, where it is provided with a compression grease cup.

Reference is to be had to the accompanying drawings forming a part of this specification, in which similar characters of reference indicate corresponding parts in both views.

Figure 1 is a section of an axle constructed in accordance with our invention, showing the hub of the wheel, the section being taken on the line 1—1 of Fig. 2; and Fig. 2 is an inner end view of the axle skein.

In carrying out our invention we provide the conventional wooden axle-tree 5 with an axle-skein 6, the skein having the customary socket for receiving the end of the tree and threaded at the outer end to receive the retaining nut 7, the socket, as shown in Fig. 2, being of elliptical form at the inner end portion and gradually tapering to a reduced circular form at the threaded end. Through the threaded end portion of the skein centrally passes a lag-screw 8 which is threaded into the axle-tree and firmly presses the skein to place. The skein essentially differs from the usual construction in that it is provided with a straight internal lubricating passage 9 extending approximately its full length, the passage discharging through openings 10, preferably three in number, located at the opposite ends and at an intermediate point of the journal portion of the skein, the passage and also the discharge openings, being of a nature as to be easily cored in the skein, thus enabling the production of the skein at a relatively low cost. The lubricating passage 9 leads from a point a substantial distance at the inner side of the journal portion of the skein, at which point is provided a compression grease cup 11, the grease cup being constructed and arranged so as not to interfere with adjacent parts of the conventional vehicle. At the inner terminus of the journal portion of the skein, the latter is preferably provided with a collar or shoulder 12, to limit the inward movement of the vehicle wheel 13. A strengthening rib 15, preferably extends externally about the skein opposite the grease compression cup and reinforces the connection between the cup and skein.

The retaining nut 7 is shown to be provided with a base flange 14, which overlies the outer end of the lubricating passage 9 and prevents the escape of the grease at this point.

The skein as shown is preferably arranged on the axle-tree, with the lubricating passage and grease cup at the upper side, in which position the grease has a tendency to flow toward the discharge openings.

Having thus described our invention, we claim as new and desire to secure by Letters Patent:

1. An axle skein having a compression grease cup adjacent to its inner end and provided with a lubricating passage extending from the cup, the lubricating passage extending through the outer end of the skein and having a discharge opening at a point along the length of the journal portion of the skein.

2. An axle skein having an outer threaded end and provided with a lubricating passage arranged in the wall thereof and extending approximately the full length of the skein, a compression grease cup communicating with the passage, and an axle nut threaded on the outer end of the skein and closing the outer end of the lubricating passage.

In testimony whereof we have signed our names to this specification in the presence of two subscribing witnesses.

CARL EMERSON.
JULIUS PETERSON.

Witnesses:
LEWIS C. GJERTSEN,
H. G. IRVINE.